United States Patent
Banno et al.

(10) Patent No.: US 6,595,600 B2
(45) Date of Patent: Jul. 22, 2003

(54) FRONT-REAR BRAKING FORCE DISTRIBUTION CONTROL SYSTEM

(75) Inventors: Masaki Banno, Nagoya (JP); Shigeru Mashimo, Nishikamo-gun (JP); Toshihisa Nihei, Mishima (JP)

(73) Assignees: Aisin Seiki Kabushiki Kaisha, Kariya (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/911,609

(22) Filed: Jul. 25, 2001

(65) Prior Publication Data

US 2002/0024252 A1 Feb. 28, 2002

(30) Foreign Application Priority Data

Jul. 27, 2000 (JP) ........................................ 2000-227924

(51) Int. Cl.[7] ................................................ B60T 8/34
(52) U.S. Cl. .................... 303/113.5; 303/186; 303/9.62
(58) Field of Search ........................... 303/113.1, 113.5, 303/155, 186, 9.62, 166, DIG. 1, DIG. 2, DIG. 3, DIG. 4; 701/70

(56) References Cited

U.S. PATENT DOCUMENTS

| | | | | |
|---|---|---|---|---|
| 5,281,012 A | * | 1/1994 | Binder et al. | 303/113.5 |
| 5,624,164 A | * | 4/1997 | Tozu et al. | 303/9.62 |
| 5,826,954 A | * | 10/1998 | Schmitt et al. | 303/186 |
| 6,206,490 B1 | * | 3/2001 | Tozu et al. | 303/168 |
| 6,354,676 B1 | | 3/2002 | Oshiro | |
| 6,385,523 B1 | * | 5/2002 | Yokoyama et al. | 701/70 |

FOREIGN PATENT DOCUMENTS

| | | |
|---|---|---|
| DE | 198 58 376 A1 | 6/1999 |
| EP | 0 392 815 A1 | 10/1990 |
| EP | 0 594 860 B1 | 7/1999 |
| EP | 692 29 634 T2 | 2/2000 |
| JP | 58-199259 A | 11/1983 |
| JP | 5-270375 A | * 10/1993 |
| JP | 5-294221 A | * 11/1993 |
| JP | 6-336157 A | * 12/1994 |
| JP | 9-11878 A | 1/1997 |

* cited by examiner

*Primary Examiner*—Matthew C. Graham
*Assistant Examiner*—Mariano Sy
(74) *Attorney, Agent, or Firm*—Burns, Doane, Swecker & Mathis, LLP

(57) ABSTRACT

The present invention is directed to a front-rear braking force distribution control system for a vehicle. The system includes a wheel brake cylinders operatively associated with front and rear wheels of the vehicle, a pressure generator for pressurizing brake fluid in response to operation of a brake pedal to generate a hydraulic braking pressure and supply it to each of the wheel brake cylinders, and a pressure control device disposed between the pressure generator and the wheel brake cylinders for controlling the braking pressure in each of the wheel brake cylinders. A pressure sensor is provided for detecting the braking pressure generated by the pressure generator, and the detected braking pressure is compared with a predetermined threshold pressure. The braking force control device provides conditions for beginning the front-rear braking force distribution control, including at least a condition for beginning the front-rear braking force distribution control, when the detected braking pressure exceeds the predetermined threshold pressure, which may be set in accordance with a pressure increasing rate of the braking pressure.

10 Claims, 5 Drawing Sheets

FRONT-REAR BRAKING FORCE DISTRIBUTION CONTROL SYSTEM

This application claims priority under 35 U.S.C. Sec. 119 to No.2000-227924 filed in Japan on Jul. 27, 2000, the entire content of which is herein incorporated by reference.

BACKGROUND OF THE INVENTION

1. Field of the Invention

The present invention relates to a front-rear braking force distribution control system for controlling the braking force applied to rear wheels to be in a certain relationship with the braking force applied to front wheels in accordance with a state of braking operation of a vehicle.

2. Description of the Related Arts

In general, when a moving vehicle is braked, axle loads applied to the front and rear portions of the vehicle respectively will be different from each other due to the moving load caused by the braking operation. Therefore, the braking force applied to front wheels and the braking force applied to rear wheels for locking all of the wheels simultaneously are not in direct proportion to each other, but in such a relationship as called an ideal braking force distribution, which may be varied depending upon the presence or absence of the load on the vehicle.

In this respect, Japanese patent Laid-open Publication No.58-199259 discloses a hydraulic braking pressure control apparatus, which includes a pressure control valve disposed in a brake pipe for rear wheels for restraining the hydraulic braking pressure supplied to the rear wheels, and a rotational speed detection device for detecting a state that the rotational speed of the rear wheel has become less than the rotational speed of the front wheel, to actuate the pressure control valve. According to that apparatus, therefore, when the rotational speed of the rear wheel has become less than the rotational speed of the front wheel, the hydraulic braking pressure applied to the rear wheels is limited, to prevent the rear wheels from being locked.

Furthermore, Japanese patent Laid-open Publication No.9-011878 proposes a method of braking force distribution control for a vehicle, wherein unnecessary braking force distribution control caused by a road surface variation or the like is avoided, by providing a necessary condition that a vehicle deceleration exceeds a reference value thereof, when the braking force distribution control is performed. In that Publication, it is described that the unnecessary braking force distribution control can be avoided, by performing the braking force distribution control, when the vehicle deceleration exceeds a first reference value of the vehicle deceleration, in such a condition that a difference between the front and rear wheel speeds is shifted from a target wheel speed difference. It is also described that, when the vehicle deceleration exceeds a second reference value of the vehicle deceleration which is greater than the first reference value, the braking force distribution control may be performed irrespective of the difference between the front and rear wheel speeds, whereby the braking force distribution control can be begun immediately, even in the case where the variation of the difference between the front and rear wheel speeds is delayed due to influence of a pitching motion of the vehicle body to be varied gradually in a rapid braking operation.

According to the front-rear braking force distribution control apparatus as described in the Publication No.58-199259, when the brake pedal is depressed gradually, the braking force applied to the front and rear wheels is distributed properly in accordance with a desired ratio. However, when the brake pedal is depressed more rapidly than a load shift in a normal braking operation, i.e., when the rapid operation of the brake pedal is performed, then a control for distributing the braking force applied to the front and rear wheels will be delayed. This is because when the brake pedal is depressed rapidly, the front wheel cylinder pressure will reach a pressure for enabling the front wheel to be locked before a desired load shift will occur, to result in a large drop of the front wheel speed, so that the condition for beginning the braking force distribution control will not be satisfied, although it is generally constituted that the braking force distribution control will begin when the rear wheel speed becomes less than the front wheel speed by more than a predetermined value. Thereafter, the load will be shifted to the front wheel to reduce the rear wheel speed, and when the rear wheel speed becomes less than the front wheel speed by more than the predetermined value, the braking force distribution control will finally begin. In the Publication No.58-199259, however, nothing is disclosed about the rapid operation of the brake pedal as described above.

And, the apparatus as disclosed in the Japanese patent Laid-open Publication No.9-011878, it is disclosed that when the vehicle deceleration exceeds the reference value thereof, the braking force distribution control may be performed. In view of the fact that the vehicle deceleration is increased by depressing the brake pedal, the rapid operation of the brake pedal can be detected by the rapid increase of the vehicle deceleration. According to the apparatus as disclosed in the Publication No.9-011878, therefore, the braking force distribution control can be begun earlier than the apparatus as disclosed in the Publication No.58-199259. However, it is still insufficient, especially for a so-called multi utility vehicle having the gravity center thereof placed at a relatively high position, which is now quite popular, the load shift is relatively large, so that the pitching motion may be caused when braking. With respect to the vehicle having the high gravity center, therefore, it is preferable to avoid using the prior apparatus or method as described in those publications.

SUMMARY OF THE INVENTION

Accordingly, it is an object of the present invention to provide a front-rear braking force distribution control system for use in various vehicles including a vehicle having the gravity center placed at a relatively high position, to perform the front-rear braking force distribution control properly.

In accomplish the above and other objects, a front-rear braking force distribution control system includes wheel brake cylinders operatively associated with front and rear wheels of a vehicle for applying the braking force thereto, respectively, a pressure generator for pressurizing brake fluid in response to operation of a brake pedal to generate a hydraulic braking pressure and supply the hydraulic braking pressure to each of the wheel brake cylinders, and a pressure control device disposed between the pressure generator and the wheel brake cylinders for controlling the hydraulic braking pressure in each of the wheel brake cylinders. A pressure detection device is provided for detecting the hydraulic braking pressure generated by the pressure generator. A comparison device is provide for comparing the hydraulic braking pressure detected by the pressure detection device with a predetermined threshold pressure. And, a braking force control device is provided for controlling the pressure control device to adjust the braking force applied to the rear wheels in accordance with a predetermined relationship with the braking force applied to the front wheels to perform the front-rear braking force distribution control. The braking force control device is adapted to provide conditions for beginning the front-rear braking force distribution control, including at least a condition for beginning the front-rear braking force distribution control performed by controlling the pressure control device, when the comparison device determines that the hydraulic braking pressure detected by the pressure detection device exceeds the predetermined threshold pressure.

Preferably, the system may further include an increasing rate determination device for determining a pressure increasing rate of the hydraulic braking pressure detected by the pressure detection device, and a threshold pressure setting device for setting the predetermined threshold pressure in accordance with the pressure increasing rate determined by the increasing rate determination means.

The system may further include a vehicle deceleration detection device for detecting a vehicle deceleration of the vehicle. And, it may be so arranged that the comparison device compares the hydraulic braking pressure detected by the pressure detection device with the predetermined threshold pressure, and compares the vehicle deceleration detected by the vehicle deceleration detection device with a predetermined threshold deceleration, and that the braking force control device provides the condition for beginning the front-rear braking force distribution control performed by controlling the pressure control device, when the comparison device determines that the hydraulic braking pressure detected by the pressure detection device exceeds the predetermined threshold pressure, and that the vehicle deceleration detected by the vehicle deceleration detection device exceeds the predetermined threshold deceleration.

Furthermore, the system may further includes wheel speed sensors for detecting wheel speeds of the front and rear wheels, respectively, and a vehicle deceleration calculation device for calculating a vehicle deceleration of the vehicle on the basis of the wheel speeds detected by the wheel speed sensors. The braking force control device is preferably adapted to provide the condition for beginning the front-rear braking force distribution control performed by controlling the pressure control device, when the braking force control device determines that at least one of the rear wheels is in a slip condition on the basis of the wheel speeds detected by the wheel speed sensors, and determines that the vehicle deceleration calculated by the vehicle deceleration calculation device exceeds a predetermined deceleration, in the case where the comparison device determines that the hydraulic braking pressure detected by the pressure detection device is equal to or less than the predetermined threshold pressure.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENT

Figure 1:
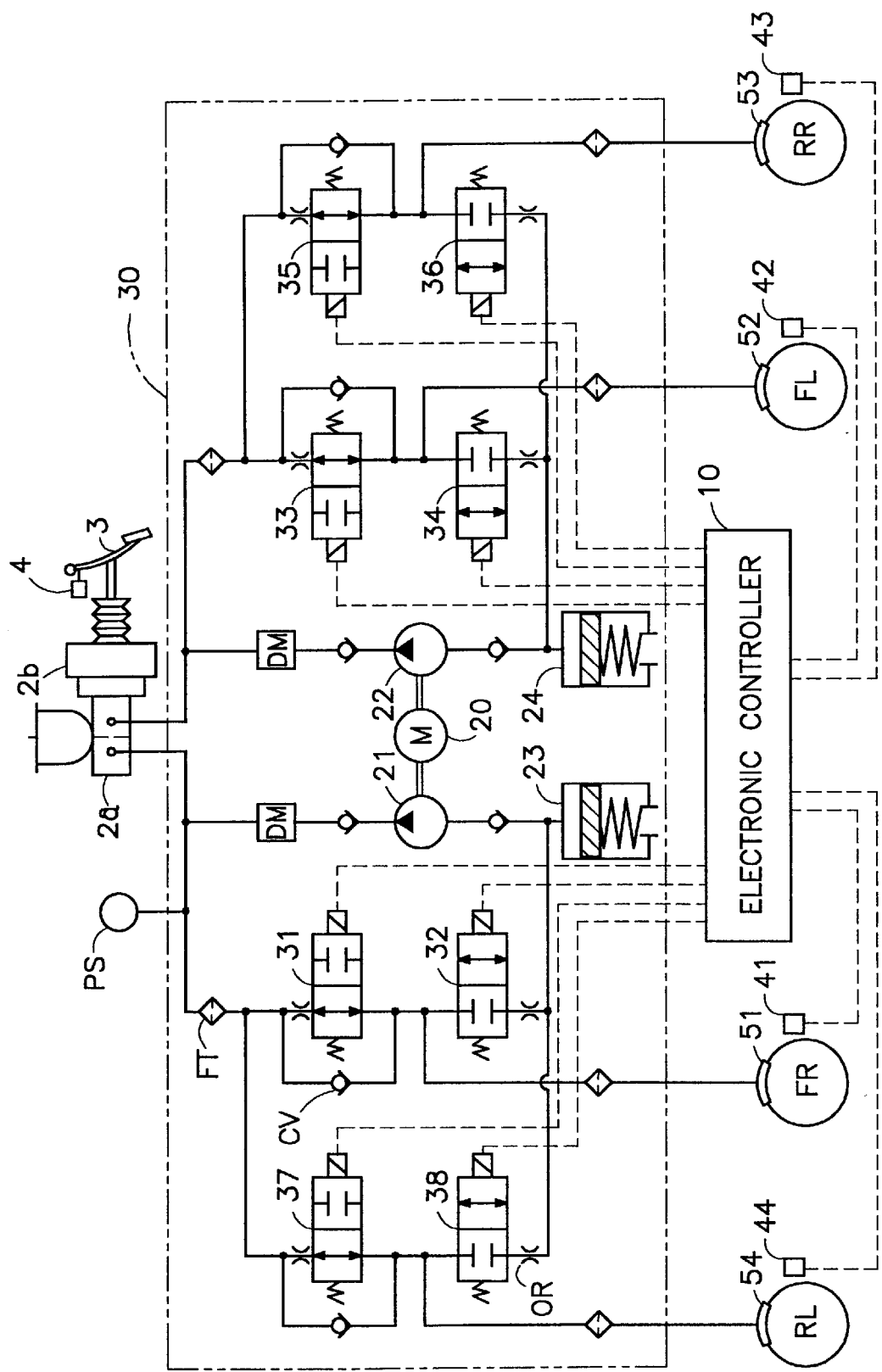
FIG. 1 is a block diagram illustrating a front-rear braking force distribution control system according to an embodiment of the present invention.

Referring to FIG. 1, there is schematically illustrated a front-rear braking force distribution control system according to an embodiment of the present invention, which also functions as an anti-skid control system, wherein a master cylinder 2a and a booster 2b are driven by a brake pedal 3 to serve as a pressure generator according to the present invention. Wheel brake cylinders 51 to 54 are operatively associated with wheels FR, FL, RR, RL of the vehicle, respectively. The wheel FR designates the wheel at the front right side as viewed from the position of a driver's seat, the wheel FL designates the wheel at the front left side, the wheel RR designates the wheel at the rear right side, and the wheel RL designates the wheel at the rear left side. According to the present embodiment, a diagonal circuit (X-circuit) system is formed as shown in FIG. 1, while a front-rear dual circuit system may be formed.

Between the master cylinder 2a and the wheel brake cylinders 51 to 54, an actuator 30 is disposed to serve as a pressure control device. The actuator 30 is formed as enclosed by a two-dot chain line in FIG. 1. Normally open solenoid valves 31, 37 are disposed in hydraulic pressure passages for connecting one output port of the master cylinder 2a with the wheel brake cylinders 51, 54, respectively, and an output port of a hydraulic pressure pump 21 is connected to a position between the master cylinder 2a and the valves 31, 37. Likewise, normally open solenoid valves 33, 35 are disposed in passages for connecting another output port of the master cylinder 2a with the wheel brake cylinders 52, 53, respectively, and an output port of a hydraulic pressure pump 22 is connected to a position between the master cylinder 2a and the valves 33, 35. The hydraulic pressure pumps 21, 22 are driven by an electric motor 20 to supply pressurized brake fluid into each hydraulic pressure passage. In the pressure passage from which the hydraulic braking pressure is discharged from the master cylinder 2a as shown in FIG. 1, a master cylinder pressure sensor PS is provided to serve as a pressure detection device according to the present invention. The wheel brake cylinders 51, 54 are connected to the normally closed solenoid valves 32, 38, the downstream sides of which are connected to a reservoir 23 and the input port of the pump 21. The wheel brake cylinders 52, 53 are connected to the normally closed solenoid valves 34, 36, the downstream sides of which are connected to a reservoir 24 and the input port of the pump 22. Each of the reservoirs 23, 24 has a piston and a spring as shown in FIG. 1 to store the brake fluid discharged from the wheel brake cylinders through the solenoid valves 32, 34, 36, 38.

The solenoid valves 31 to 38 are of two-port two-position solenoid operated changeover valves which are placed in their first operating positions as shown in FIG. 1 to communicate the wheel brake cylinders 51 to 54 with the master cylinder 2a. When the solenoids of the valves are energized, they are placed in their second operating positions to block the communication between the wheel brake cylinders 51 to 54 and the master cylinder 2a, and communicate the wheel brake cylinders 51 to 54 with the reservoir 23 or 24. In FIG. 1, "DM" indicates a damper, "CV" indicates a check valve, "OR" indicates an orifice, and "FT" indicates a filter. Each check valve CV is provided for allowing the flow of the brake fluid from the wheel brake cylinders 51 to 54 and reservoirs 23, 24 toward the master cylinder 2a and preventing the reverse flow. With the solenoid valves 31 to 38 controlled to be energized or de-energized, the hydraulic braking pressure in the wheel brake cylinders 51 to 54 will be increased, decreased or held. That is, when the solenoid valves 31 to 38 are de-energized, the hydraulic braking pressure in the master cylinder 2a and the pressure pump 21 or 22 is supplied into the wheel brake cylinders 51 to 54 to increase the hydraulic braking pressure therein, whereas when the solenoid valves 31 to 38 are energized, the wheel brake cylinders 51 to 54 are communicated with the reservoir 23 or 24 to decrease the hydraulic braking pressure in the wheel brake cylinders 51 to 54. Or, when the solenoid valves 31, 33, 35, 37 are energized, and the solenoid valves 32, 34, 36, 38 are de-energized, the hydraulic pressure in the wheel brake cylinders 51 to 54 will be held. Therefore, by controlling the time period between the energizing the solenoid valves and de-energizing them, a pulse pressure increasing operation, or stepped pressure increasing operation will be performed to increase the pressure gradually, or may be performed to decrease the pressure gradually by a pulse pressure decreasing operation.

The solenoid valves 31 to 38 are electrically connected to an electronic controller 10 to energize or de-energize each solenoid coil. Wheel speed sensors 41 to 44 are associated with the wheels FR, FL, RR, RL to feed rotational speeds of the wheels, i.e., wheel speed signals to the controller 10, respectively. Furthermore, the master cylinder pressure sensor PS, a brake switch 4 which is turned on when the brake pedal 3 is depressed, and etc. are connected to the controller 10. The electronic controller 10 is provided with a microcomputer (not shown) which includes a central processing unit (CPU), memories (ROM and RAM), a timer, an input interface, an output interface, and etc.

Figure 2:
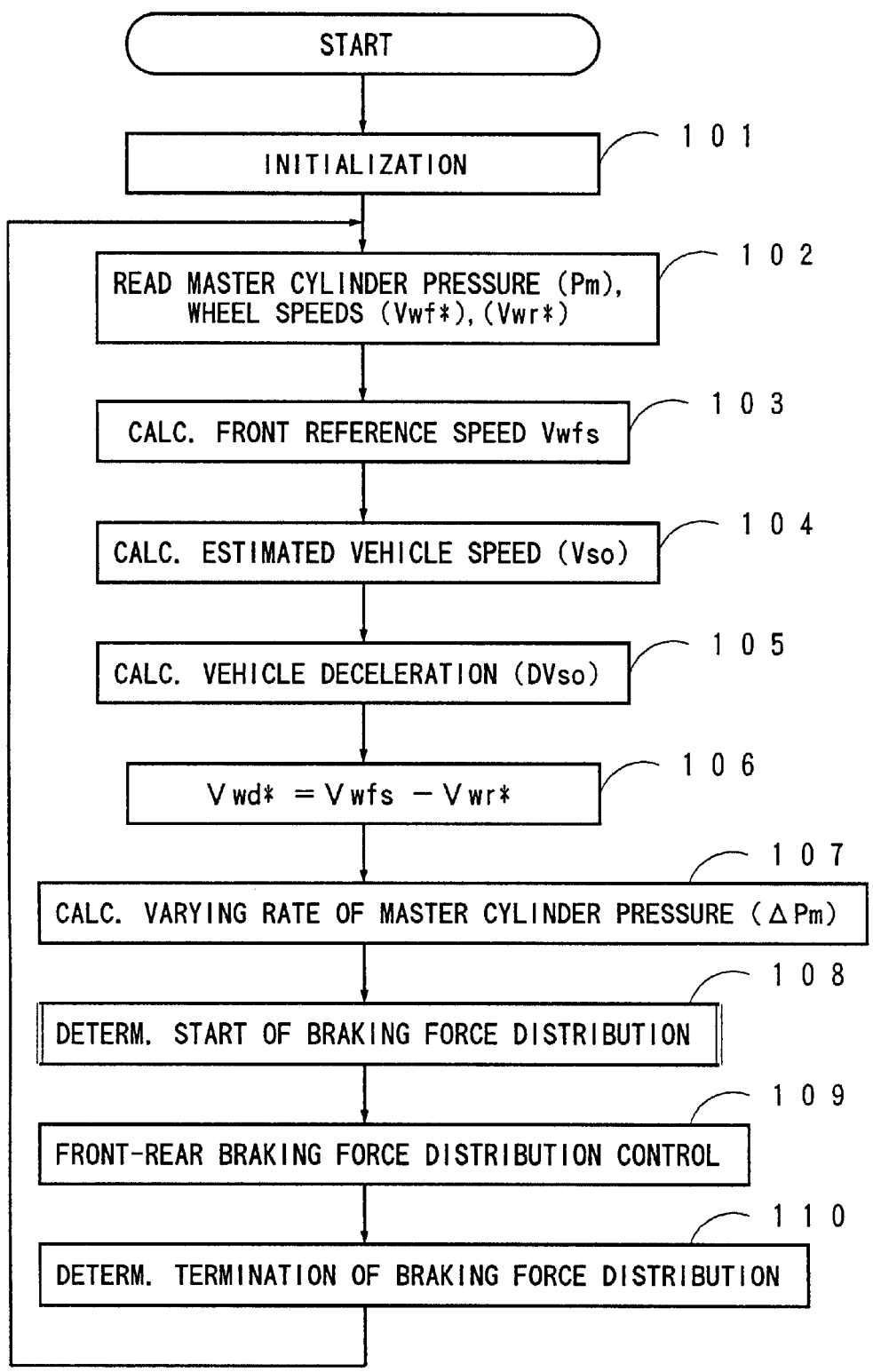
FIG. 2 is a flowchart showing a main routine of the front-rear braking force distribution control according to the above embodiment of the present invention.

According to the present embodiment as constituted above, the front-rear braking force distribution control is executed to control the actuator 30 in accordance with a flowchart as shown in FIG. 2, wherein the program routine starts when an ignition switch (not shown) is turned on. At Step 101, an initialization of the system is made to clear various data. Then, at Step 102, the master cylinder pressure (Pm) detected by the master cylinder sensor PS is read, and the signals (i.e., front wheel speed (Vwf*) and rear wheel speed (Vwr*), where "*" indicates left or right) detected by the wheel speed sensors 41–44 are read, and the front reference wheel speed (Vwfs) is calculated at Step 103. The minimum of the front wheel speeds (Vwfl) and (Vwfr) is provided for the front reference wheel speed (Vwfs=MIN (Vwfl, Vwfr)). The program further proceeds to Step 104 where the estimated vehicle speed (Vso) is calculated on the basis of the wheel speeds (Vwf*) and (Vwr*), and then the estimated vehicle speed (Vso) is differentiated at Step 105, so that the estimated vehicle deceleration (DVso) is obtained. At Step 106, the wheel speed difference (Vwd*=Vwfs−Vwr*) between the front reference wheel speed (Vwfs) and the rear wheel speed (Vwr*) of the rear wheel to be controlled is calculated.

Then, the program proceeds to Step 107, where the master cylinder pressure (Pm) is differentiated to provide a varying rate (ΔPm) of the master cylinder pressure. The master cylinder pressure (Pm) indicates the depressed amount of the brake pedal 3, whereas the increasing rate of the varying rate (ΔPm) of the master cylinder pressure indicates the depressed speed of the brake pedal 3. Thereafter, the program proceeds to Step 108, where the condition for beginning the front-rear braking force distribution control is determined, and the front-rear braking force distribution control is performed at Step 109, in the same manner as the control in the prior system. Then, the condition for terminating the front-rear braking force distribution control is determined at Step 110. If the wheel speed difference (Vwd*) has become less than a predetermined value, for example, the front-rear braking force distribution control is terminated. Otherwise, the program returns to Step 102.

Figure 3:
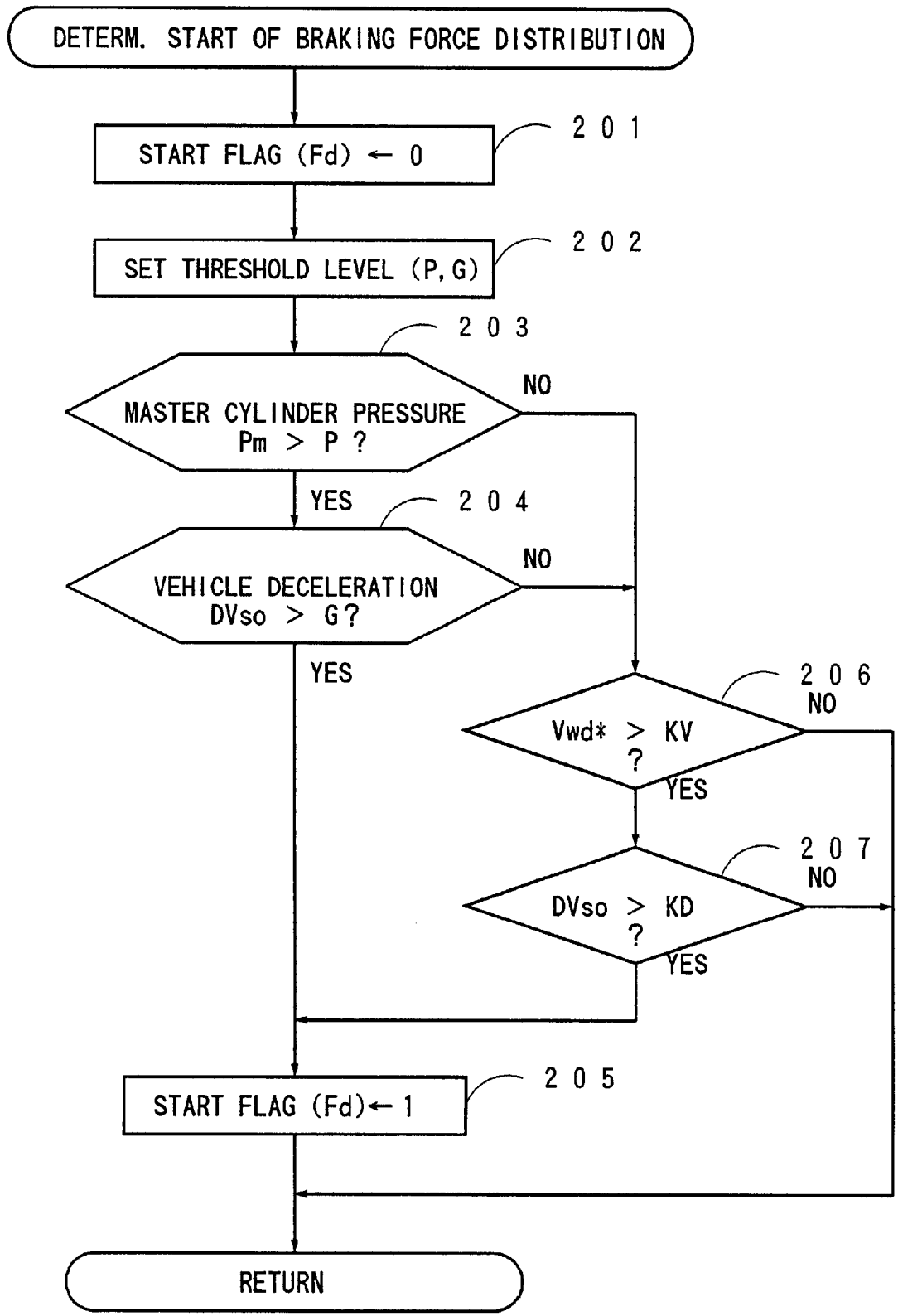
FIG. 3 is a flowchart showing a sub-routine for determining start of the front-rear braking force distribution control according to the above embodiment of the present invention.

Next will be described the determination of the condition for beginning the front-rear braking force distribution control to be executed at Step 109, with reference to FIG. 3. First, a start flag (Fd) indicative of beginning the front-rear braking force distribution control is reset (to be "0") at Step 201 in FIG. 3. Then, the program proceeds to Step 202, where a plurality of threshold pressures (indicated by "P") and a plurality of threshold decelerations (indicated by "G"), which will be described later in detail. Then, the program proceeds to Step 203, where the master cylinder pressure (Pm) is compared with the threshold pressure (P). If the master cylinder pressure (Pm) exceeds the threshold pressure (P), it is determined that the depressed amount of the brake pedal 3 exceeds a predetermined amount, so that the program further proceeds to Step 204, where the vehicle deceleration (DVso) is compared with the threshold deceleration (G). Then, if it is determined that the vehicle deceleration (DVso) exceeds the threshold deceleration (G), the program proceeds to Step 205, where the start flag (Fd) indicative of beginning the front-rear braking force distribution control is set (to be "1"), so that the front-rear braking force distribution control is performed at Step 109 as shown in FIG. 2. That is, even in the case where the master cylinder pressure (Pm) exceeds the threshold pressure (P), if the hydraulic braking system including the wheel brake cylinders or the like is damaged for example, it is necessary to prohibit the front-rear braking force distribution control from being performed only on the basis of the result determined at Step 203. Therefore, if it is determined at Step 204 that the vehicle deceleration (DVso) has not reached the threshold deceleration (G), the program proceeds to Step 206.

With respect to the threshold pressure (P) to be set at Step 202, threshold pressures (P1)–(P6) are provided in accordance with the varying rate (only increasing rate is employed in this embodiment, and hereinafter simply referred to as increasing rate (ΔPm)) of the master cylinder pressure calculated at Step 107, and the estimated vehicle speed (hereinafter, simply referred to as vehicle speed (Vso)) calculated at Step 104. If the increasing rate (ΔPm) exceeds the predetermined value (DP), the threshold pressure (P1), (P2) or (P3) is set. These threshold pressures (P1), (P2) and (P3) are provided to satisfy "P1>P2>P3". Whereas, if the increasing rate (ΔPm) is equal to or less than the predetermined value (DP), the threshold pressure (P4), (P5) or (P6) is set. These threshold pressures (P4), (P5) and (P6) are provided to satisfy "P4>P5>P6", and "P1>P4".

Furthermore, the threshold pressure (P1), (P2) or (P3) is set in accordance with the vehicle speed (Vso), which is calculated when the increasing rate (ΔPm) exceeds the predetermined value (DP). That is, the vehicle speed (Vso) is compared with the reference speed (KVa) or (KVb). These reference speeds (KVa) and (KVb) are provided to satisfy "KVa<KVb". If the vehicle speed (Vso) is less than the reference speed (KVa), then the threshold pressure (P1) is set. If the vehicle speed (Vso) is equal to or greater than the reference speed (KVa) and less than the reference speed (KVb), the threshold pressure (P2) is set. And, if the vehicle speed (Vso) is equal to or greater than the reference speed (KVb), the threshold pressure (P3) is set. Whereas, the threshold pressure (P4), (P5) or (P6) is set in accordance with the vehicle speed (Vso), which is calculated when the increasing rate (ΔPm) is equal to or less than the predetermined value (DP). If the vehicle speed (Vso) is less than the reference speed (KVa), the threshold pressure (P4) is set. If the vehicle speed (Vso) is equal to or greater than the reference speed (KVa) and less than the reference speed (KVb), the threshold pressure (P5) is set. And, if the vehicle speed (Vso) is equal to or greater than the reference speed (KVb), the threshold pressure (P6) is set.

Likewise, threshold decelerations (G1)–(G6) are provided in accordance with the increasing rate (ΔPm) and the vehicle speed (Vso). If the increasing rate (ΔPm) exceeds the predetermined value (DP), the threshold deceleration (G1), (G2) or (G3) is set. These threshold decelerations (G1), (G2) and (G3) are provided to satisfy "G1>G2>G3". Whereas, if the increasing rate (ΔPm) is equal to or less than the predetermined value (DP), the threshold deceleration (G4), (G5) or (G6) is set. These threshold decelerations (G4), (G5) and (G6) are provided to satisfy "G4>G5>G6", and "G1>G4". Furthermore, the threshold deceleration (G1), (G2) or (G3) is set in accordance with the vehicle speed (Vso), which is calculated when the increasing rate (ΔPm) exceeds the predetermined value (DP). That is, the vehicle speed (Vso) is compared with the reference speed (KVa) or (KVb). If the vehicle speed (Vso) is less than the reference speed (KVa), the threshold deceleration (G1) is set. If the vehicle speed (Vso) is equal to or greater than the reference speed (KVa) and less than the reference speed (KVb), the threshold deceleration (G2) is set. And, if the vehicle speed (Vso) is equal to or greater than the reference speed (KVb), the threshold deceleration (G3) is set. Whereas, the threshold deceleration (G4), (G5) or (G6) is set in accordance with the vehicle speed (Vso), which is calculated when the increasing rate (ΔPm) is equal to or less than the predetermined value (DP). If the vehicle speed (Vso) is less than the reference speed (KVa), the threshold deceleration (G4) is set. If the vehicle speed (Vso) is equal to or greater than the reference speed (KVa) and less than the reference speed (KVb), the threshold deceleration (G5) is set. And, if the vehicle speed (Vso) is equal to or greater than the reference speed (KVb), the threshold deceleration (G6) is set.

Thus, the greater the vehicle speed (Vso) is, the lower the threshold pressure (P) and threshold deceleration (G) are set. Therefore, the faster the vehicle runs, the earlier the front-rear braking force distribution control begins, so that the greater braking force is applied to the front wheels. Accordingly, stability of the vehicle running fast can be ensured.

In the case where it is determined at Step 203 that the master cylinder pressure (Pm) is equal to or less than the threshold pressure (P), and the case where it is determined at Step 204 that the vehicle deceleration (DVso) is equal to or less than the threshold deceleration (G), the program proceeds to Step 206, where the wheel speed difference (Vwd*=Vwfs−Vwr*) between the front reference wheel speed (Vwfs) and the wheel speed (Vwr*) of the rear wheel is compared with a predetermined value (KV, negative value). When it is determined that the wheel speed difference (Vwd*) is greater than the predetermined value (KV), i.e., when the sum of the wheel speed (Vwr*) of the rear wheel and the value (KV) is less than the front reference wheel speed (Vwfs), it is determined that the rear wheel is in a slip state, so that the program proceeds to Step 207. Then, the vehicle deceleration (DVso) is compared with a predetermined value (KD) at Step 207. If it is determined that the vehicle deceleration (DVso) exceeds the predetermined value (KD), the program further proceeds to Step 205, where the start flag (Fd) for beginning the front-rear braking force distribution control is set (to be "1"). In the case where it is determined at Step 206 that the wheel speed difference (Vwd*) is equal to or less than the predetermined value (KV), and determined at Step 207 that the vehicle deceleration (DVso) is equal to or less than the predetermined value (KD), the program returns to the main routine as shown in FIG. 2.

Figure 4:
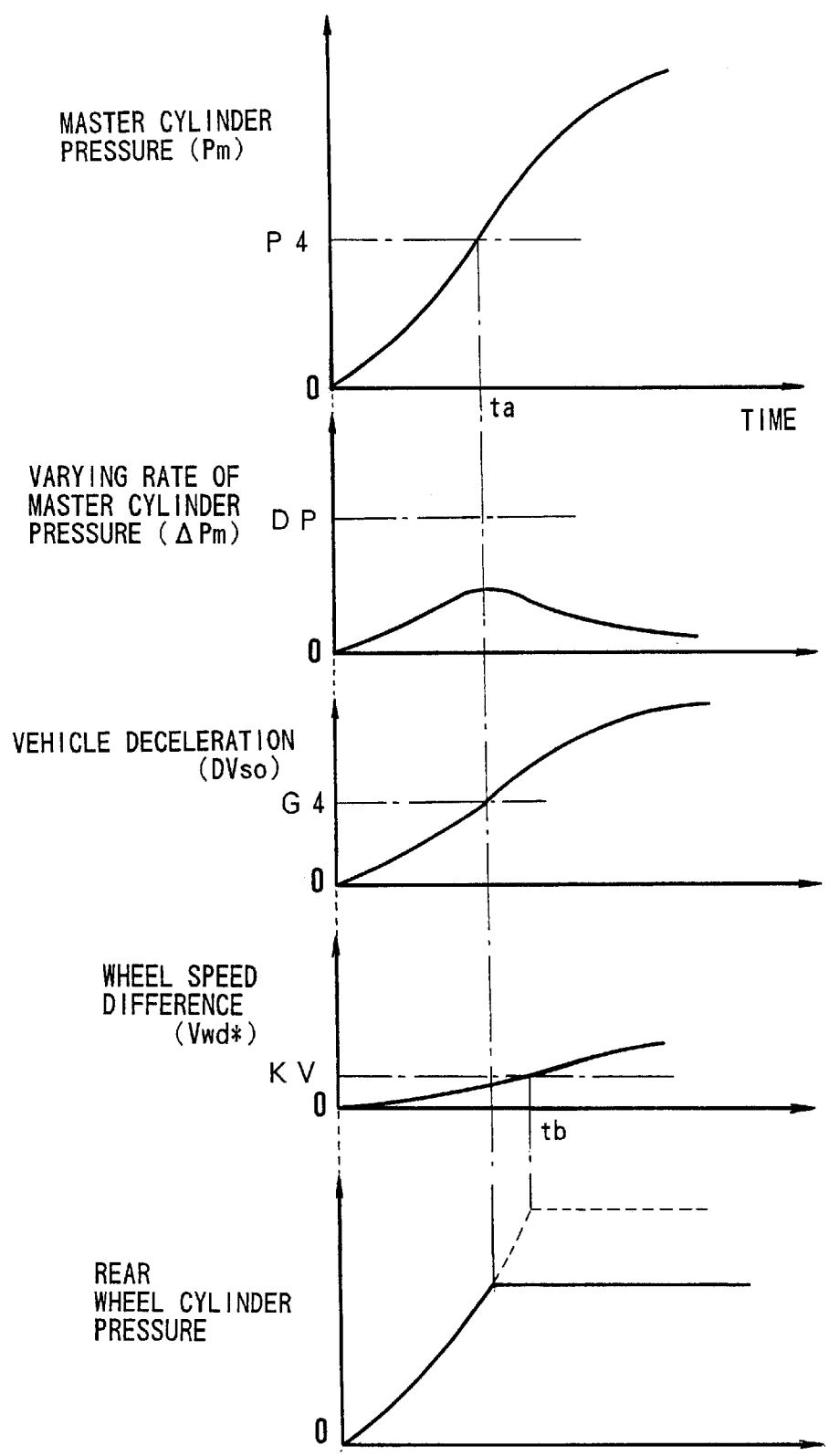
FIG. 4 is a diagram showing variations of master cylinder pressure, varying rate thereof, vehicle deceleration, wheel speed difference between the front and rear wheels, and rear wheel cylinder pressure, in the front-rear braking force distribution control.

FIG. 4 illustrates a state of the front-rear braking force distribution control performed when the vehicle speed (Vso) is equal to or less than the reference speed (KVa), according to the present embodiment. In this state, the threshold pressure (P4) and threshold deceleration (G4) are set, as described before. Therefore, the front-rear braking force distribution control begins at the time (ta) in FIG. 4, when the vehicle deceleration (DVso) becomes equal to or less than the threshold deceleration (G4), in the case where the master cylinder pressure (Pm) is equal to or less than the threshold pressure (P4). After the time (ta), the wheel cylinder pressure for the rear wheel is limited to a certain value, as shown by a solid line in the bottom graph of FIG. 4. In FIG. 4, it happens that the time when the master cylinder pressure (Pm) becomes equal to or less than the threshold pressure (P4) coincides with the time when the vehicle deceleration (DVso) becomes equal to or less than the threshold deceleration (G4). In general, however, it is so arranged that the former time precedes the latter time.

On the contrary, according to the prior apparatus as shown in the Publication No.58-199259, the wheel speed difference Vwd* is compared with the predetermined value (KV), as shown in the second graph from the bottom in FIG. 4, and at the time when it is determined that the wheel speed difference Vwd* is less than the predetermined value (KV), i.e., at the time (tb) that is later than the time (ta), the front-rear braking force distribution control begins, as shown by a broken line in the bottom graph in FIG. 4. Therefore, the wheel cylinder pressure for the rear wheel is limited at the time (tb), when the wheel cylinder pressure has become relatively high. This is because detection of the slip state is delayed by a filtering delay caused by the filtering operation, which is performed so as to avoid a false detection, in view of the fact that the wheel speed difference Vwd* for indicating the slip state of the rear wheel is a quite small speed difference detected between the front and rear wheels.

Figure 5:
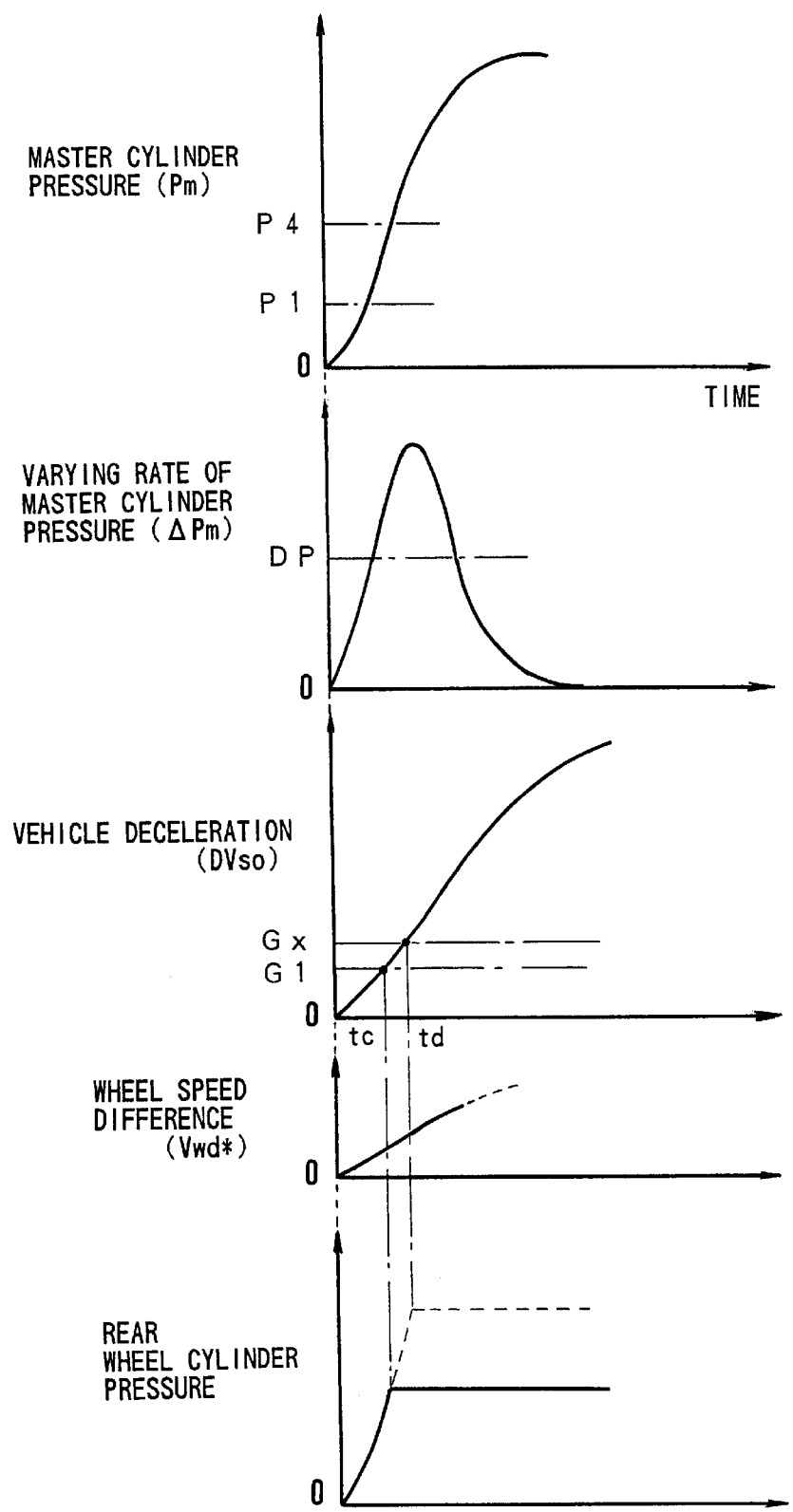
FIG. 5 is a diagram showing variations of master cylinder pressure, varying rate thereof, vehicle deceleration, wheel speed difference between the front and rear wheel speeds, and rear wheel cylinder pressure, in the case where the front-rear braking force distribution control is performed when a brake pedal is rapidly depressed.

FIG. 5 illustrates the state of the front-rear braking force distribution control that is performed when the brake pedal 3 is depressed rapidly so that the increasing rate (ΔPm) exceeds the predetermined value (DP), in the same state as shown in FIG. 4, wherein the vehicle speed (Vso) is equal to or less than the reference speed (KVa). In this state, the threshold pressure (P1) and threshold deceleration (G1) are set, as described before. In FIG. 5, the threshold pressure (P4) is also shown, so as to be compared with the state as shown in FIG. 4. Therefore, the front-rear braking force distribution control begins at the time (tc) in FIG. 5, when the vehicle deceleration (DVso) becomes equal to or less than the threshold deceleration (G1), in the case where the master cylinder pressure (Pm) is equal to or less than the threshold pressure (P1). After the time (tc), the wheel cylinder pressure for the rear wheel is limited to a certain value, as shown by a solid line in the bottom graph of FIG. 5.

On the contrary, when the front-rear braking force distribution control is performed in response to the vehicle deceleration according to the prior apparatus as shown in the Publication No.9-011878, when the vehicle deceleration (DVso) becomes less than a threshold deceleration (Gx), i.e., the time (td) as shown in the middle graph of FIG. 5, that is later than the time (tc) in the present embodiment, the front-rear braking force distribution control begins, as shown by a broken line in the bottom graph in FIG. 5. This is because the threshold deceleration (G) is set in accordance with the increasing rate (ΔPm) of the master cylinder pressure according to the present embodiment, and the increasing rate (ΔPm) varies largely as shown in the second graph in FIG. 5, and its variation is employed in setting the threshold deceleration (G). In FIGS. 4 and 5, the threshold values (DP) are indicated by the same scale, so that the variation of the master cylinder pressure (Pm) can be compared easily.

According to the present embodiment as described above, the threshold pressure (P) and threshold deceleration (G) are set in accordance with the varying rate (increasing rate) (ΔPm) of the master cylinder pressure, so that when the brake pedal 3 is depressed rapidly, the front-rear braking force distribution control can be begun early. Therefore, the front-rear braking force distribution control can be performed properly without causing a considerable delay, when the brake pedal is depressed rapidly, even in the case where the vehicle is of a relatively high gravity center.

It should be apparent to one skilled in the art that the above-described embodiment is merely illustrative of but one of the many possible specific embodiments of the present invention. Numerous and various other arrangements can be readily devised by those skilled in the art without departing from the spirit and scope of the invention as defined in the following claims.

What is claimed is:

1. A front-rear braking force distribution control system for a vehicle, comprising:

wheel brake cylinders operatively associated with front and rear wheels of said vehicle for applying the braking force thereto, respectively;

pressure generating means for pressurizing brake fluid in response to operation of a brake pedal to generate a hydraulic braking pressure and supply the hydraulic braking pressure to each of said wheel brake cylinders;

pressure control means disposed between said pressure generating means and said wheel brake cylinders for controlling the hydraulic braking pressure in each of said wheel brake cylinders to perform a front-rear braking force distribution control;

pressure detection means for detecting the hydraulic braking pressure generated by said pressure generating means;

increasing rate determination means for determining a pressure increasing rate of the hydraulic braking pressure detected by said pressure detection means;

threshold pressure setting means for setting a threshold pressure in accordance with the pressure increasing rate determined by said increasing rate determination means;

comparison means for comparing the hydraulic braking pressure detected by said pressure detection means with the threshold pressure; and braking force control means for controlling said pressure control means to adjust the braking force applied to said rear wheels in accordance with a predetermined relationship with the braking force applied to said front wheels to perform the front-rear braking force distribution control, wherein said braking force control means provides conditions for beginning the front-rear braking force distribution control, including at least a condition for beginning the front-rear braking force distribution control performed by controlling said pressure control means, when said comparison means determines that the hydraulic braking pressure detected by said pressure detection means exceeds the threshold pressure.

2. The front-rear braking force distribution control system according to claim 1, further comprising:

vehicle deceleration detection means for detecting a vehicle deceleration of said vehicle:

threshold deceleration setting means for setting a threshold deceleration in accordance with the pressure increasing rate determined by said increasing rate determination means; and wherein said comparison means compares the hydraulic braking pressure detected by said pressure detection means with the threshold pressure, and compares the vehicle deceleration detected by said vehicle deceleration detection means with the threshold deceleration, and wherein said braking force control means provides the condition for beginning the front-rear braking force distribution control performed by controlling said pressure control means when said comparison means determines that the hydraulic braking pressure detected by said pressure detection means exceeds the threshold pressure and that the vehicle deceleration detected by said vehicle deceleration detection means exceeds the threshold deceleration.

3. The front-rear braking force distribution control system according to claim 1, further comprising:

wheel speed detection means for detecting wheel speeds of said front and rear wheels, respectively; and vehicle deceleration calculation means for calculating a vehicle deceleration of said vehicle on the basis of the wheel speeds detected by said wheel speed detection means, wherein said braking force control means provides the condition for beginning the front-rear braking force distribution control performed by controlling said pressure control means when said braking force control means determines that at least one of said rear wheels is in a slip condition on the basis of the wheel speeds detected by said wheel speed detection means, and determines that the vehicle deceleration calculated by said vehicle deceleration calculation means exceeds a predetermined deceleration in the case where said comparison means determines that the hydraulic braking pressure detected by said pressure detection means is equal to or less than the threshold pressure.

4. The front-rear braking force distribution control system according to claim 3, further comprising wheel speed difference calculation means for calculating a wheel speed difference between the wheel speed of said front wheel and the wheel speed of said rear wheel detected by said wheel speed detection means, wherein said braking force control means determines whether said rear wheel is in a slip condition on the basis of the wheel speed difference calculated by said wheel speed difference calculation means, and wherein said braking force control means provides the condition for beginning the front-rear braking force distribution control performed by controlling said pressure control means, in the case where said braking force control means determines that said rear wheel is in the slip condition.

5. The front-rear braking force distribution control system according to claim 1, wherein said threshold pressure setting means sets the threshold pressure to be higher when the pressure increasing rate determined by said increasing rate determination means exceeds a predetermined pressure increasing rate than the threshold pressure which is set by said threshold pressure setting means when the pressure increasing rate determined by said increasing rate determination means is equal to or less than the predetermined pressure increasing rate.

6. The front-rear braking force distribution control system according to claim 5, further comprising:

wheel speed detection means for detecting wheel speeds of said front and rear wheels, respectively; and vehicle speed calculation means for calculating a vehicle speed on the basis of the wheel speeds detected by said wheel speed detection means, wherein said threshold pressure setting means sets the threshold pressure to be varied in response to the vehicle speed calculated by said vehicle speed calculation means.

7. The front-rear braking force distribution control system according to claim 2, wherein said threshold deceleration setting means sets the threshold deceleration to be greater when the pressure increasing rate determined by said increasing rate determination means exceeds a predetermined pressure increasing rate than the threshold deceleration which is set by said threshold pressure setting means when the pressure increasing rate determined by said increasing rate determination means is equal to or less than the predetermined pressure increasing rate.

8. The front-rear braking force distribution control system according to claim 7, further comprising:

wheel speed detection means for detecting wheel speeds of said front and rear wheels, respectively; and vehicle speed calculation means for calculating a vehicle speed on the basis of the wheel speeds detected by said wheel speed detection means, wherein said threshold deceleration setting means sets the threshold deceleration to be varied in response to the vehicle speed calculated by said vehicle speed calculation means.

9. A front-rear braking force distribution control system for a vehicle, comprising:

wheel brake cylinders operatively associated with front and rear wheels of said vehicle for applying the braking force thereto, respectively;

pressure generating means for pressurizing brake fluid in response to operation of a brake pedal to generate a hydraulic braking pressure and supply the hydraulic braking pressure to each of said wheel brake cylinders;

pressure control means disposed between said pressure generating means and said wheel brake cylinders for controlling the hydraulic braking pressure in each of said wheel brake cylinders to perform a front-rear braking force distribution control;

pressure detection means for detecting the hydraulic braking pressure generated by said pressure generating means;

comparison means for comparing the hydraulic braking pressure detected by said pressure detection means with a predetermined threshold pressure;

wheel speed detection means for detecting wheel speeds of said front and rear wheels, respectively; and braking force control means for controlling said pressure control means to adjust the braking force applied to said rear wheels in accordance with a predetermined relationship with the braking force applied to said front wheels to perform the front-rear braking force distribution control, said braking force control means providing a condition for beginning the front-rear braking force distribution control on the basis of the wheel speeds detected by said wheel speed detection means, said braking force control means beginning the front-rear braking force distribution control when the condition for beginning the front-rear braking force is fulfilled even if said comparison means determines that the hydraulic braking pressure detected by said pressure detection means has not exceeded the predetermined threshold pressure, and said braking force control means beginning the front-rear braking force distribution control when said comparison means determines that the hydraulic braking pressure detected by said pressure detection means exceeds the predetermined threshold pressure even if the condition for beginning the front-rear braking force has not been fulfilled.

10. The front-rear braking force distribution control system according to claim 9, further comprising vehicle deceleration calculation means for calculating a vehicle deceleration of said vehicle on the basis of the wheel speeds detected by said wheel speed detection means, wherein said braking force control means provides the condition for beginning the front-rear braking force distribution control on the basis of at least one of the vehicle deceleration and a difference between the wheel speed of said front wheel and the wheel speed of said rear wheel.

* * * * *